US005428864A

United States Patent [19]

Pemberton

[11] Patent Number: 5,428,864

[45] Date of Patent: Jul. 4, 1995

[54] REFUSE COLLECTING APPARATUS

[75] Inventor: Peter Pemberton, Selby, England

[73] Assignee: Suk-cess Limited, West Yorkshire, United Kingdom

[21] Appl. No.: 232,053

[22] PCT Filed: Jul. 13, 1992

[86] PCT No.: PCT/GB92/01266

§ 371 Date: Apr. 28, 1994

§ 102(e) Date: Apr. 28, 1994

[87] PCT Pub. No.: WO93/09297

PCT Pub. Date: May 13, 1993

[30] Foreign Application Priority Data

Nov. 5, 1991 [GB] United Kingdom ................. 9123492

[51] Int. Cl.$^6$ ................ B01D 29/94

[52] U.S. Cl. ................ 15/348; 15/349; 15/339; 55/395; 55/430

[58] Field of Search ................ 15/339, 349, 348, 314, 15/340.1; 55/430, 432, 429, 395

[56] References Cited

U.S. PATENT DOCUMENTS

| | | | |
|---|---|---|---|
| 2,482,166 | 9/1949 | Gage | 15/348 |
| 3,877,207 | 4/1975 | Lemelson | 56/13.2 |
| 4,925,467 | 5/1990 | Jordan et al. | 55/430 |
| 5,013,343 | 5/1991 | Miyamoto | 55/395 |

FOREIGN PATENT DOCUMENTS

| | | |
|---|---|---|
| 0121511 | 10/1984 | European Pat. Off. . |
| 2150496 | 4/1973 | Germany . |
| 3124722 | 3/1982 | Germany . |
| 3242929 | 5/1984 | Germany . |

*Primary Examiner*—David A. Scherbel
*Assistant Examiner*—Reginald L. Alexander
*Attorney, Agent, or Firm*—Edwin D. Schindler

[57] ABSTRACT

A refuse collecting machine in which a collection hose sucks refuse into a delivery chamber containing a rotating perforated wheel for separating lighter weight refuse from the air flow to a fan, and the refuse then drops into a rotary compression screw to be compressed into a replaceable bag supported at the machine outlet.

8 Claims, 7 Drawing Sheets

REFUSE COLLECTING APPARATUS

BACKGROUND OF THE INVENTION

This invention relates to refuse collecting apparatus.

There already exist waste collecting machines of several types. One known type is a special purpose lorry incorporating underneath vacuum and brush equipment for cleaning the curb/gulley regions of roads. A second known type is a ride-on smaller purpose built vehicle for cleaning the floor areas of pedestrian precincts and the like. A third type is a pedestrian controlled vacuum and brush cleaning machine used for town pavements and the like. Basically, all these vehicles collect refuse within the width of the path of movement of the machine. Refuse to the side, for example trapped on road verges, in hedges, on roadway fences and the like cannot be collected by the known machines and it is necessary to resort to manual collection with spiked tools and refuse bags.

Recently there has been proposed a refuse collecting machine with a relatively long refuse collection hose, which can be wandered over the region around the machine to suck refuse into a space from which it can be compacted into a waste storage chamber by a ram.

SUMMARY OF THE INVENTION

It is an object of this invention to provide an improved refuse collecting apparatus having a wander-capable collection hose.

According to the invention, there is provided refuse collecting apparatus comprising a wander-capable refuse collection hose, a prime mover, a fan driven by the prime mover, whereby refuse can be sucked inwardly through the collection hose a refuse compression screw driven by the prime mover, means whereby collected refuse is directed into the compression screw, and collecting means for receiving the collected and compressed refuse at the outlet end of the screw, wherein the fan also creates suction inwardly from the refuse collecting means, whereby refuse is compressed by the opposing actions of the inward suction and the outward drive of the compression screw.

The refuse collecting means preferably comprises a bag supporting means for carrying a bag into which the collected refuse is driven by the compression screw. Thus, the screw, while breaking up and compressing the refuse, preferably drives the refuse into ducting to which can be sealed by releasable connecting means the mouth of a bag carried by the bag supporting means. The fan thus creates suction inwardly from within the bag, whereby refuse is compressed by the opposing actions of the inward suction out of the bag and the outward drive of the compression screw. The bag may be a continuous tube which is cut and closed between successive bag loads. A bag-loaded indicator can be provided, whereby, after switching off the apparatus, a full bag can be exchanged for an empty one or a filled portion of a tubular bag can be cut and closed.

The prime mover is preferably a diesel or petrol engine. This engine has an output shaft which through a centrifugal clutch drives the fan at relatively high speed and drives the screw at relatively low speed through a speed-reducing transmission means. Said transmission means preferably includes a shaft intermediate the engine output shaft and the driving shaft for the compression screw, and speed reduction is achieved by means of a reduction gear box and pulley belt couplings between the shafts. The engine may exhaust into the air flow into the fan, which tends to reduce toxic emissions.

At least the engine, the fan, the screw and the transmission means are preferably carried by a framework accommodated in a housing to which the wander-capable collection hose is connected through a rotary bearing, for example a wire race or nylon bearing, whereby the hose can be swung through 360 degrees around the apparatus.

Preferably, within the housing, the refuse directing means includes a delivery chamber through which air is drawn by the fan to create suction at the wander-capable hose, relatively heavy refuse dropping through said chamber into the screw and relatively light refuse being separated from the air flow in which it is entrained, thereafter to fall into the screw, at a perforated wall means through which air passes from the chamber towards the fan.

The perforated wall means preferably comprises a perforated delivery wheel driven in rotation by the prime mover. A stationary brush means may be mounted in the delivery chamber in use to brush the rotating delivery wheel.

Preferably, an air inlet duct to the fan includes a damper means for periodically closing said inlet duct for a relatively short interval, thereby for said interval to stop the air flow through the delivery chamber in order to allow any light refuse trapped by the air flow to fall into the compression screw.

The refuse delivery means preferably guides the refuse into an inlet end of the compression screw, where the turns of the screw are of relatively wide pitch. If desired, progressively towards the outlet end of the screw, the turns of said screw may be of reducing pitch, whereby progressive breaking up and compression of the refuse is achieved before it is driven into the collection bag.

The preferred apparatus of this invention is a machine having a chassis intended to sit on the load-carrying platform of a flat-bed truck or similar vehicle. The chassis therefore preferably includes fittings engageable by the arms of a fork lift truck, in order to enable the apparatus to be lifted on and off the vehicle. The aforesaid apparatus framework may also be provided with bottom corner lifting eyelets, whereby the apparatus can be lifted by a crane. Additionally, the chassis may be equipped with castors.

BRIEF DESCRIPTION OF THE DRAWING FIGURES

A practical embodiment of refuse collecting machine in accordance with the invention is now described by way of example with reference to the accompanying drawings, in which.

Figure 5:
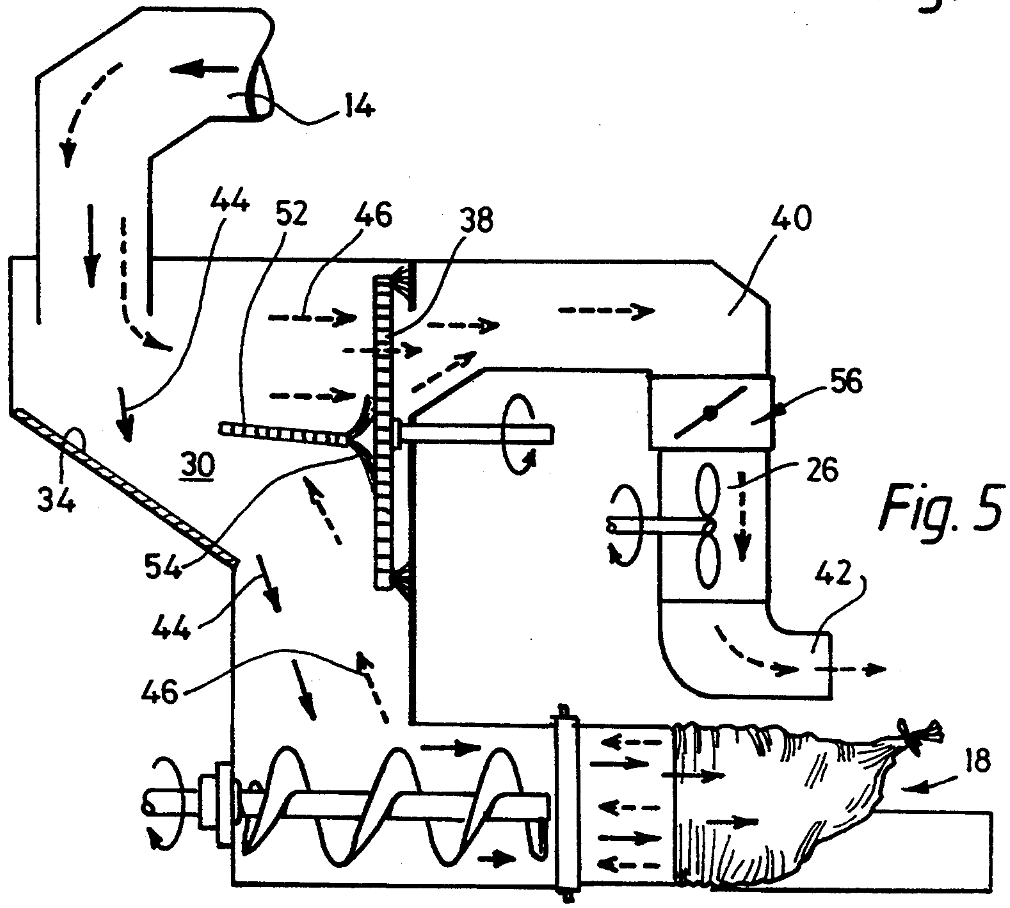
Figure 6:
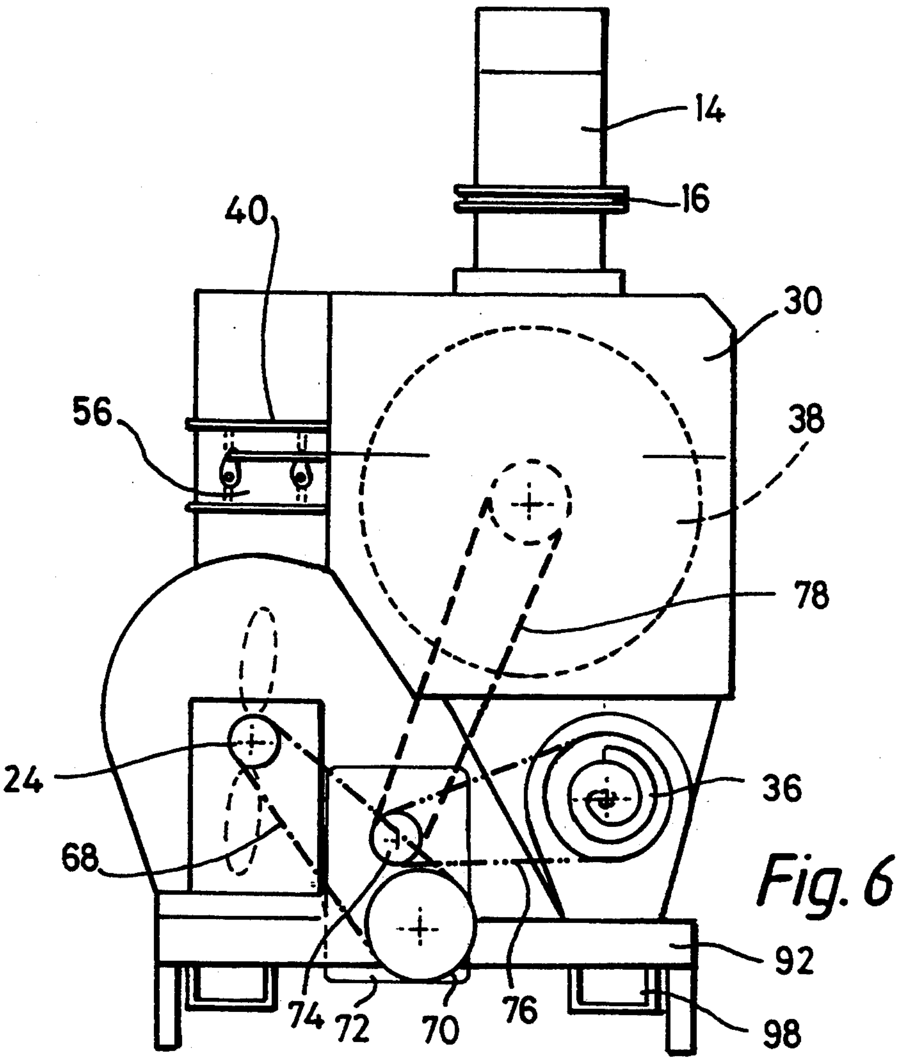
Figure 7:
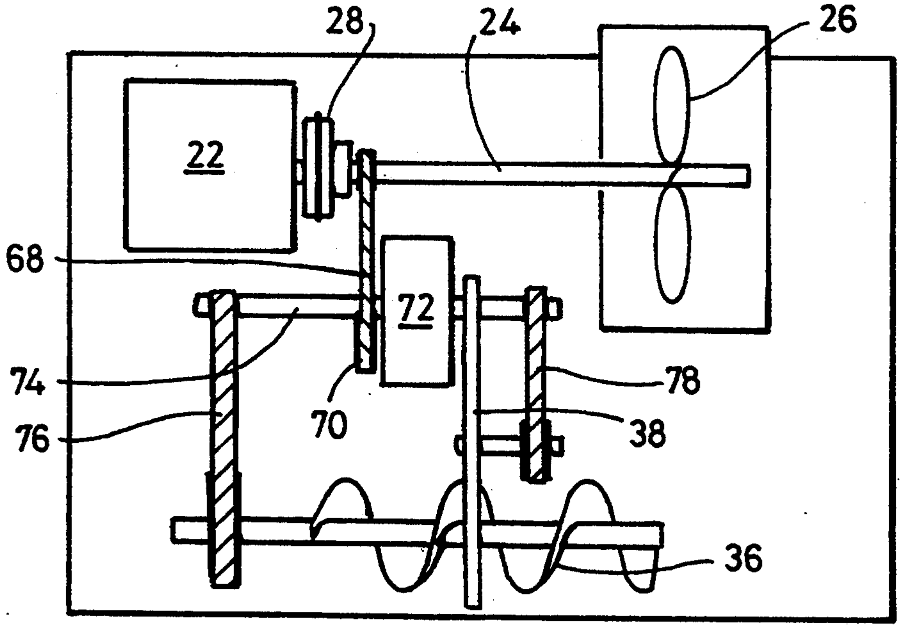
Figure 8:
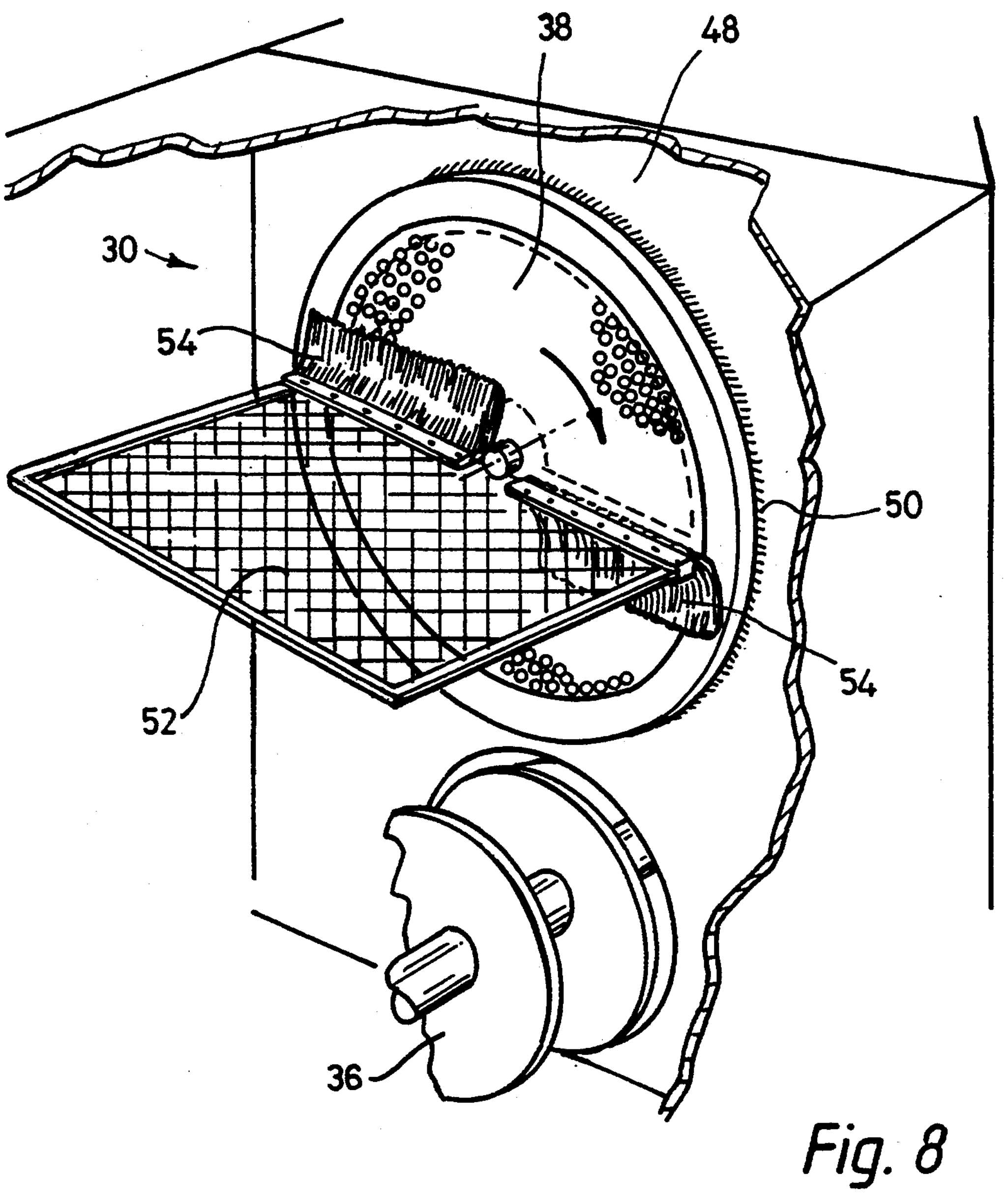

FIG. 5 scows, in very diagrammatic manner, the paths of refuse and air flows within the machine;

FIG. 6 is a diagrammatic end view of the machine within its cover, showing the drive transmission system;

FIG. 7 is a corresponding diagrammatic side view of the drive transmission system;

FIG. 8 is a perspective view within a delivery chamber of the machine; and

Figure 9:
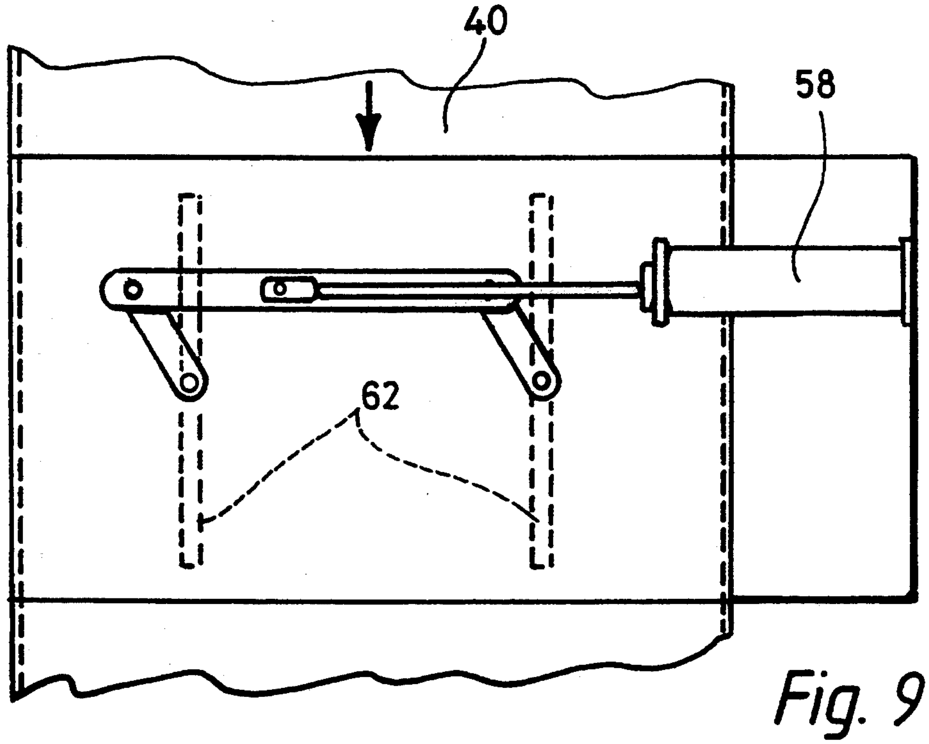
Figure 10:
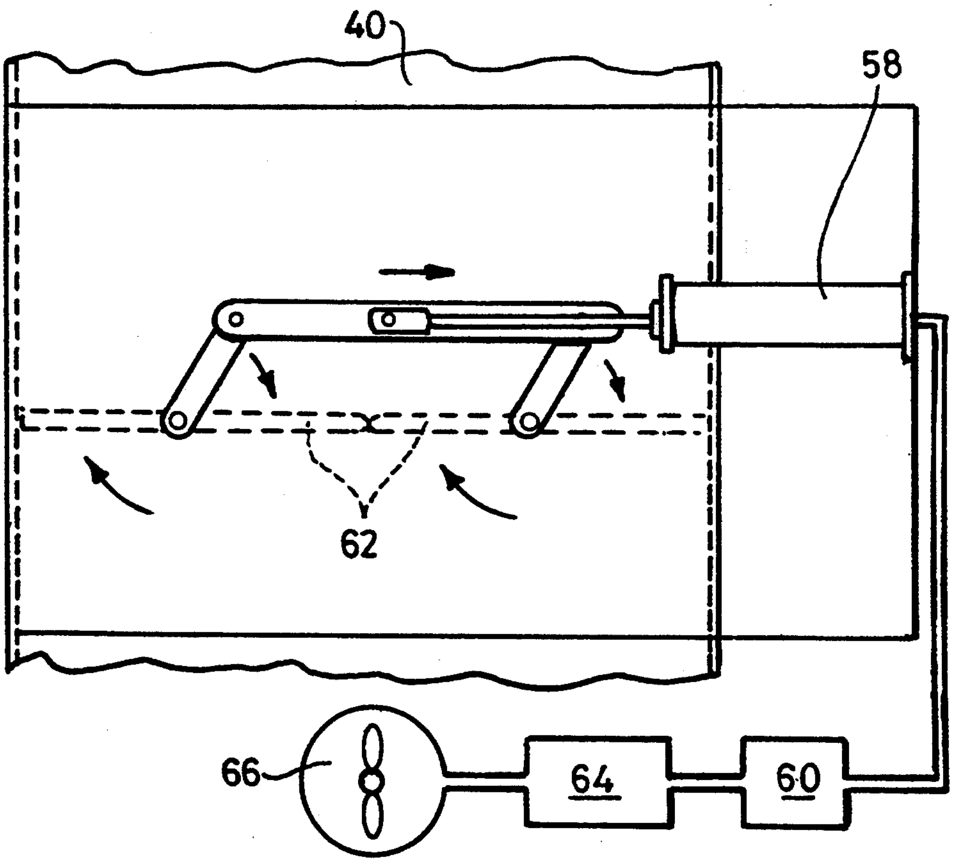

FIGS. 9 and 10 show in diagrammatic manner a damper system incorporated in an inlet duct leading to a fan.

DETAILED DESCRIPTION OF THE DRAWING FIGURES AND PREFERRED EMBODIMENTS

Figure 1:
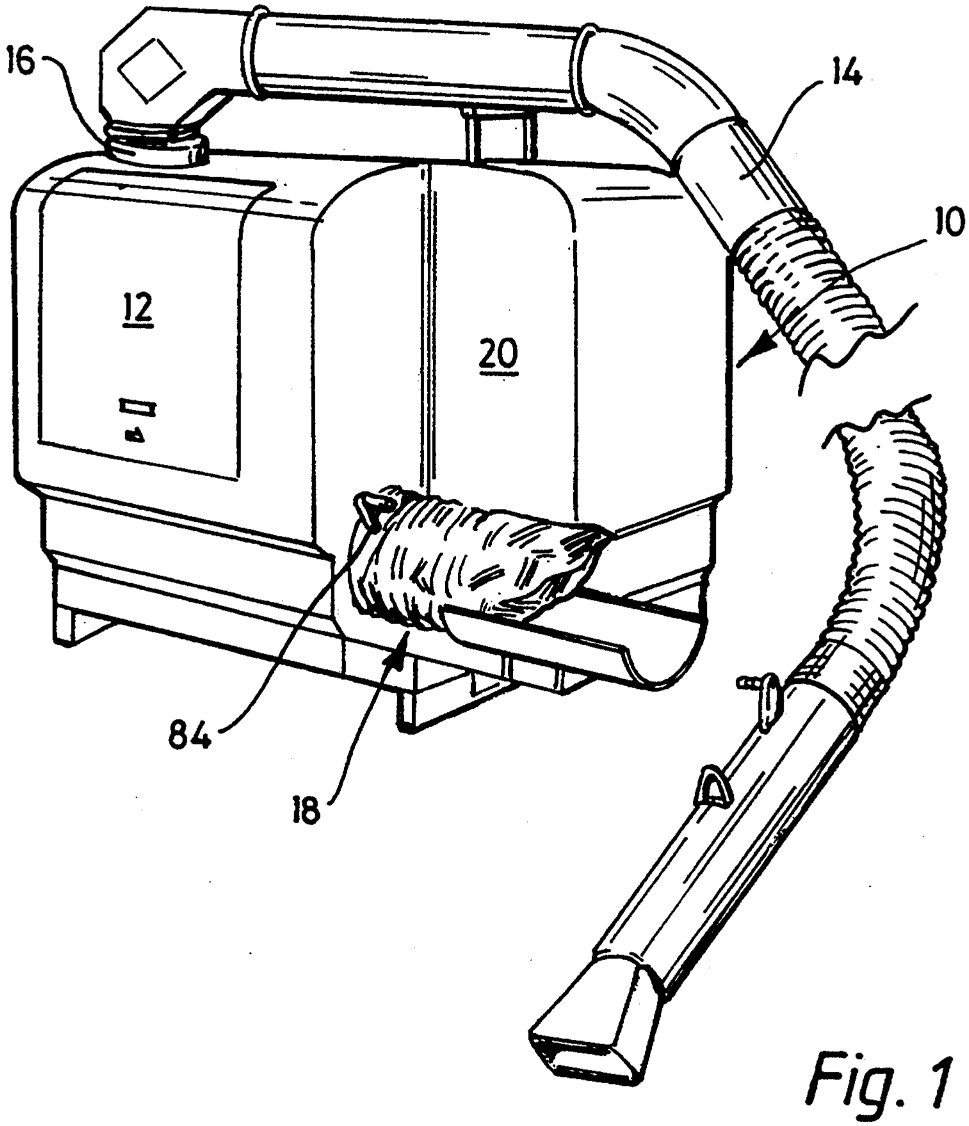
FIG. 1 is an external perspective of the machine.
Figure 2:
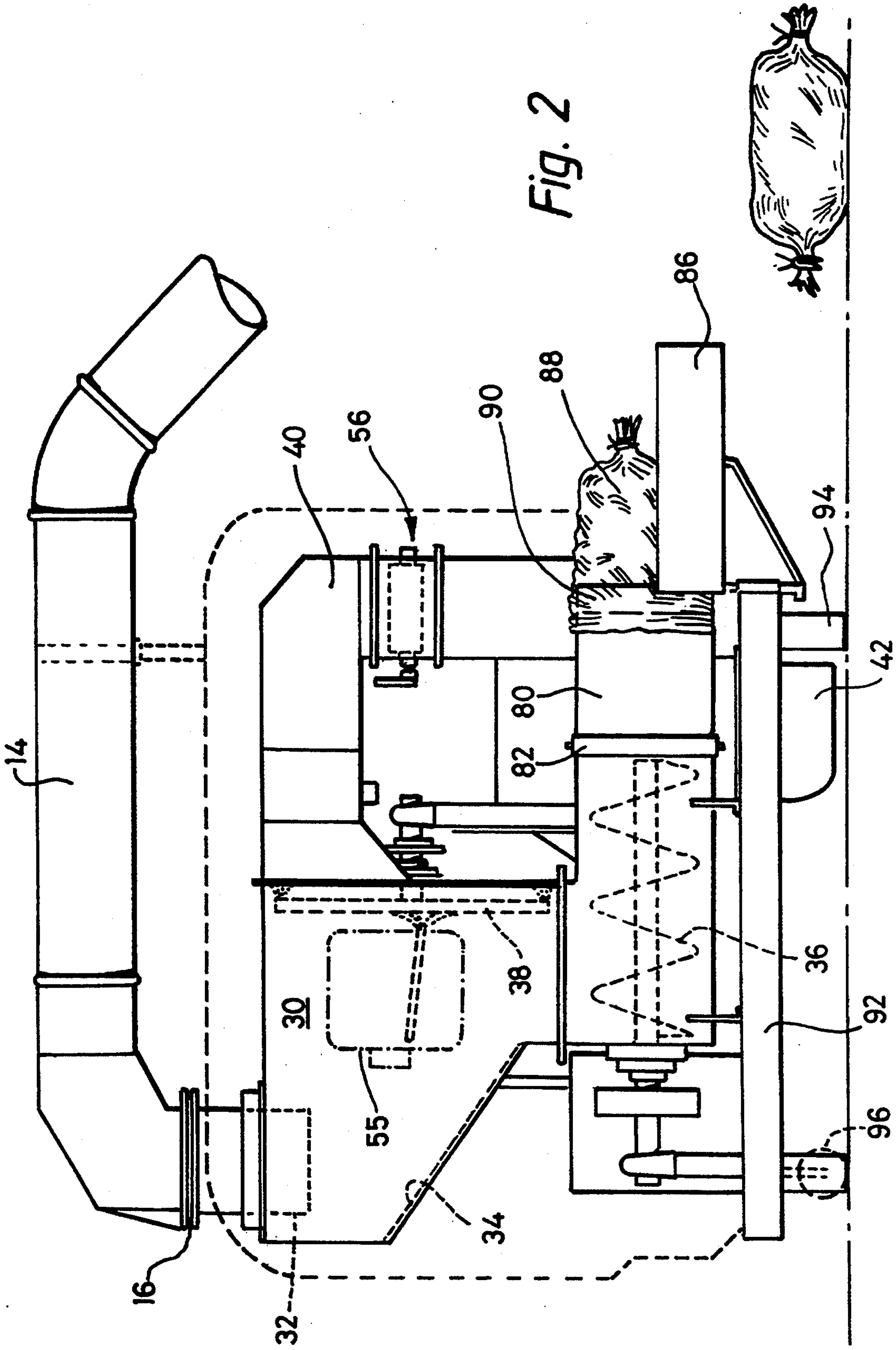
FIG. 2 is a diagrammatic elevational view of the machine inside its cover, seen from one side.

Referring briefly to FIG. 1, the illustrated machine has a cover 10 with an inspection hatch 12 affording access to internal working parts. A wander-capable hose 14 is connected through a rotary joint 16 to an intake duct leading inside the cover 10. The machinery within the cover 10 creates suction through the hose 14 whereby refuse such as drink cans, small boxes and spent packets, leaves, spent wrappers and other paper and plastics materials can be picked up and drawn into the machine, subsequently to be compressed and bagged on exit from the machine at 18, where the corner 20 of the cover 10 is inset.

The principal operative parts of the machine are shown in FIGS. 2, 3, 4, 6, 7 and 8.

A petrol or diesel i.c. engine 22 has an output shaft 24 which drives a fan 26 through a centrifugal clutch 28. The centrifugal clutch 28 automatically disengages to allow driven parts, including the fan which is driven at high speed, to slow gradually when the engine is switched off.

The fan 26 creates suction in a delivery chamber 30 into which extends the inlet duct 32 from the wander-capable hose 14, whereby refuse can be picked up by the hose and delivered into the delivery chamber. Relatively heavy refuse such as drink cans drops from the inlet duct 32 on to a strengthened oblique plate 34 defining a part of the wall of the delivery chamber 30 beneath the inlet duct 32, and from there falls into the entry end of a rotating compression screw 36. Relatively light refuse such as scraps of paper entrained in the air flow is separated from the air flow in the chamber 30 at a rotating perforated delivery wheel 38, through which air is drawn towards the fan 26 through a fan inlet duct 40. Most light refuse separated from air flow then also falls into the inlet end of the rotating compression screw 36.

FIG. 5 is very diagrammatic, as the fan 26 and its exhaust 42 are shown out of place, but the purpose of this drawing is to show the refuse and air flow paths within the machine. The path of heavy refuse is indicated by arrows 44, and the approximate air flow paths by dashed arrows 46, although in practice air movement within the delivery chamber 30 is relatively turbulent. It is to be observed that the suction in the chamber 30 tends to draw back air and refuse inwardly from the outlet 18 when the refuse is bagged, against the outwardly directed drive of the compression screw 36. In this way the refuse is very effectively compressed as it is driven into the bagging system at the cutlet 18, the total air content of the refuse being reduced from a typical 70% to about 30%.

As shown in FIG. 8, the perforated wheel 38 lies adjacent a vertical wall 48 of the delivery chamber 30, and on one face the wheel has peripheral brushes 50 which rub against this wall. On the other side, a meshed plate member 52 fixedly, mounted in the delivery chamber 30 has two brushes 54, one hard and one soft, which rub against the opposite face of the perforated delivery wheel 38.

In use, the delivery system above-described ensures that light refuse such as small scraps of paper is constantly brushed free of the delivery wheel 38 so as to fall into the compression screw 36, thus keeping the path for air flow clear.

The access hatch 12 referred to in connection with FIG. 1 provides access to a door 55 in the wall of the delivery chamber, so that any stuck items can be freed by hand if necessary, and also maintenance and servicing can be carried out. The door 55 is controlled by a timer controlled latch so that it cannot be opened until all the rotating parts have come to a stop after switching off the engine.

Additionally, however, the suction in the delivery chamber 30 is periodically interrupted to enable residual fragments of light refuse to be rubbed free to fall into the compression screw 36. This interrupting means is in the form of a damper 56 in the air inlet duct 40 to the fan 26. Details of this damper are shown in FIGS. 9 and 10.

A pneumatic ram 58 operation of which is controlled by a timer 60 effects the pivotal movement of two plates 62 movable within the fan inlet duct 40 from an open position, shown in dashed lines in FIG. 9, to a closed position, shown in dashed lines in FIG. 10. In the closed position shown in FIG. 10, the plates 62 shut off the fan 26 from communication with the delivery chamber 30 through the duct 40, so that suction ceases within the chamber, the turbulent air flow substantially stops, but as the delivery wheel 38 is still driven in rotation by the engine, any trapped light refuse is freed to fall into the compression screw 36. The timer 60 conveniently operates to close the fan inlet duct 40 for about fifteen seconds every eight minutes running time of the machine.

Air pressure for operating the ram 58 is derived from a sealed air pressure chamber 64, which during normal running is pressurised by a small compressor 66, for example driven by a small electric motor. At the end of the timed interval, the timer may cause the ram 58 to move the plates 62 back to their open position (FIG. 9), or a return spring means may be employed for this purpose.

Details of the transmission system of the machine are best shown in FIGS. 6 and 7. The output shaft 24 of the engine 22 drives the fan 26 directly, at high speed of the order of 3600 r.p.m., through the centrifugal clutch 28. A belt coupling 68 from the engine output shaft 24 drives an intermediate shaft 70 which in turn drives a reduction gear box 72. The output 74 from the gear box 72 drives the compression screw 36 (at a speed of about 37 r.p.m.) and the perforated delivery wheel 38 through respective belt couplings 76, 78.

Figure 3:
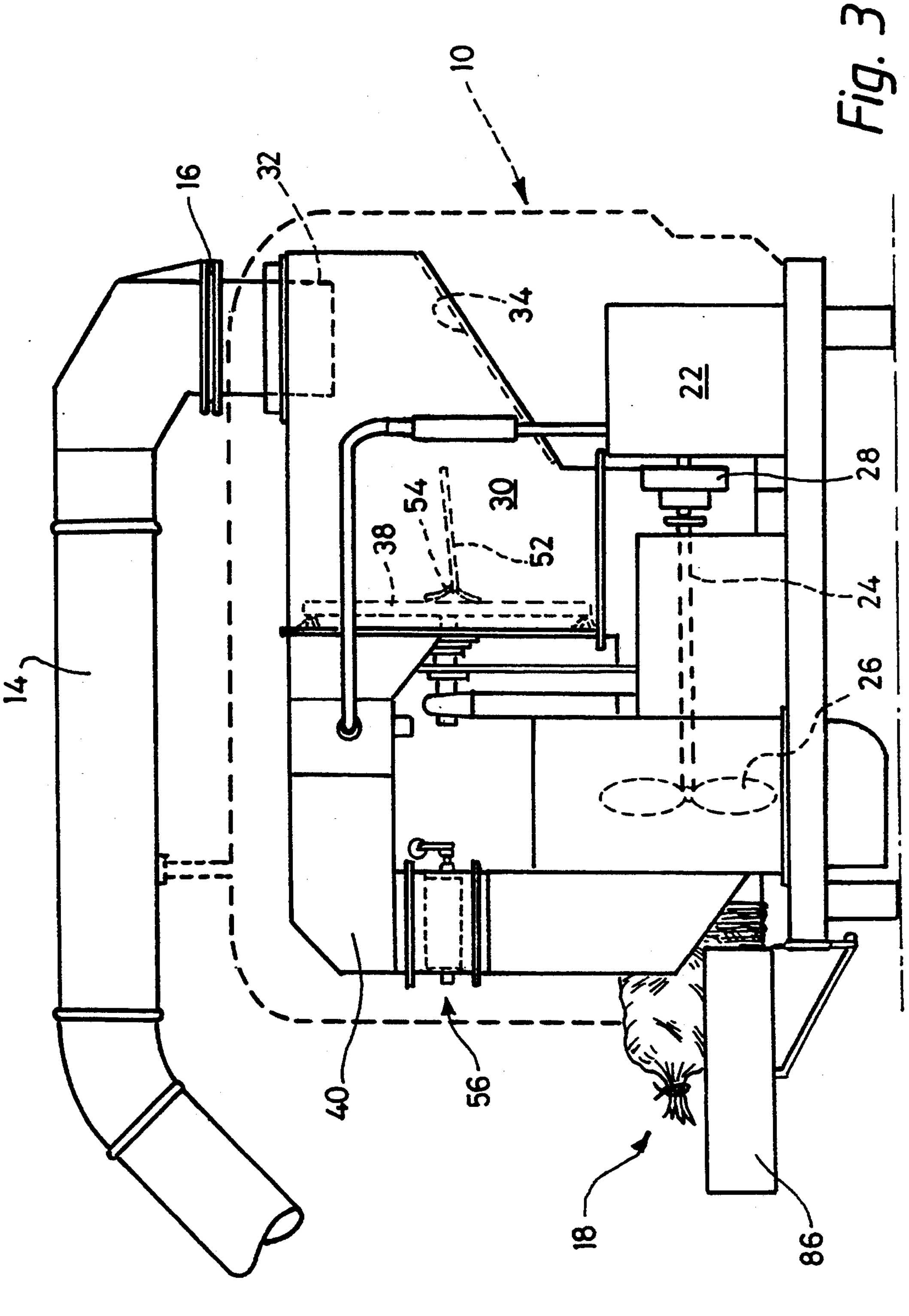
FIG. 3 is a diagrammatic elevational view of the machine inside its cover, seen from the other side.
Figure 4:
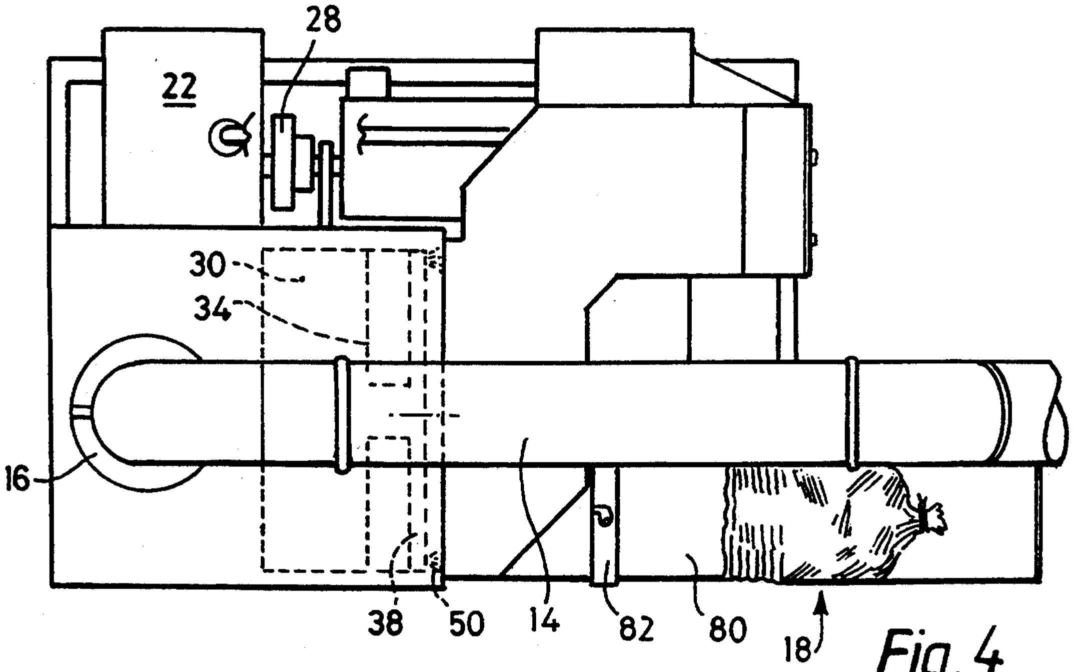
FIG. 4 is a diagrammatic plan view of the machine inside its cover.

From FIG. 3, it will also be noted that the engine 22 exhausts into the fan inlet duct 40, in order to reduce toxic emissions.

The bagging system at the outlet 18 of the machine also constitutes an important feature of the invention.

At the outlet end of a cylindrical chamber housing the output end of the compression screw 36 is a short cylindrical duct 80, detachable by means of a bayonet-type fastening 82 in conjunction with a handle 84 (FIG. 1), to which releasably attaches a cylindrically dished tray 86.

The open end of an "endless" tubular bag 88 can be sealed around the outer end of the duct 80 by a releasable clamp 90. As refuse is pushed into the bag, the bag 88 now containing refuse is pushed out over the tray 86, which supports the bag as it fills.

A bag-loaded indicator may be provided, operating to indicate that, after switching off the engine, the tubular bag should be closed and cut. Closure and cutting can be manual, or a heat sealer and cutter may be provided on the machine. Separate bags may be employed instead of an "endless" tubular bag.

The bag supporting tray 86 is normally detached when the machine is in transit and not in use.

Referring back to FIGS. 2 and 6, the machine is supported on a chassis or base 92 which is equipped with feet 94 or optional castors 96, and also with fittings 98 for engagement by the arms of a fork-lift truck, so that the machine can be loaded on to a flat-bed truck, trailer or railway platform vehicle. Additionally, corner eyelets on the base (not shown) enable the machine to be lifted by a crane.

It will be understood that the above described and illustrated embodiment may be modified in various ways within the scope of the invention defined by the appended claims.

What is claimed is:

1. A refuse collection apparatus, comprising:

a delivery chamber;

a motor;

a fan drivable by said motor;

a refuse collection hose having a free end and capable of being maneuvered in space with an opposite end connecting to said delivery chamber, said fan being operable for drawing air through said delivery chamber for creating suction at said refuse collection hose;

a compression screw into which collected refuse falls directly through said delivery chamber;

collecting means for receiving collected and compressed refuse at an outlet end of said compression screw;

means for allowing said fan to create suction inwardly along said compression screw from said collecting means; and, a perforated screen separating said delivery chamber from said fan and through which an air flow is drawn towards said fan from said delivery chamber for separating out light weight refuse entrained in the air flow so that said light weight refuse falls into said compression screw.

2. Refuse collecting apparatus as claimed in claim 1, in which the refuse collecting means comprises a bag supporting means for carrying a bag into which the collected refuse is driven by the compression screw.

3. Refuse collecting apparatus as claimed in claim 1, in which the perforated screen comprises a perforated delivery wheel driven in rotation by the motor.

4. Refuse collecting apparatus as claimed in claim 3, in which a stationary brush means is mounted in the delivery chamber in use to brush the rotating delivery wheel.

5. Refuse collecting apparatus according to claim 4, in which the motor has an output shaft providing a direct drive through a centrifugal clutch to the fan, said output shaft driving an intermediate shaft which drives a reduction gear box, and the compression screw and the delivery wheel are driven from the output side of the reduction gear box.

6. Refuse collecting apparatus as claimed in claim 4, in which an air inlet duct to the fan includes a damper means for periodically closing said inlet duct for a relatively short interval, so that said interval to stop the air flow through the delivery chamber in order to allow any light refuse trapped by the air flow to fall into the compression screw.

7. Refuse collecting apparatus according to claim 1, in which the motor is an internal combustion engine, and the engine exhaust is fed into the path of air flow into the fan.

8. Refuse collecting apparatus as claimed in claim 1, in the form of a machine having a base equipped with lifting points enabling the machine to be loaded by a fork-lift truck or crane on to a flat bed truck, trailer or rail car.

* * * * *